United States Patent
Moini et al.

(10) Patent No.: US 6,949,267 B2
(45) Date of Patent: Sep. 27, 2005

(54) COMBINATORIAL SYNTHESIS

(75) Inventors: Ahmad Moini, Princeton, NJ (US); Gerald Steven Koermer, Roseland, NJ (US); Christopher R. Castellano, Ringoes, NJ (US)

(73) Assignee: Engelhard Corporation, Iselin, NJ (US)

( * ) Notice: Subject to any disclaimer, the term of this patent is extended or adjusted under 35 U.S.C. 154(b) by 157 days.

(21) Appl. No.: 10/118,185

(22) Filed: Apr. 8, 2002

(65) Prior Publication Data

US 2003/0190408 A1 Oct. 9, 2003

(51) Int. Cl.[7] ............ B05D 1/32; B05D 1/36; B05D 3/12
(52) U.S. Cl. .......... 427/8; 427/265; 427/282; 427/287; 427/289
(58) Field of Search ............ 427/8, 265, 261, 427/282, 287, 289

(56) References Cited

U.S. PATENT DOCUMENTS

| | | | |
|---|---|---|---|
| 5,075,276 A | * 12/1991 | Ozawa et al. | 502/304 |
| 5,422,331 A | * 6/1995 | Galligan et al. | 502/333 |
| 5,688,474 A | 11/1997 | Wolf | 422/170 |
| 5,959,297 A | 9/1999 | Weinberg et al. | 250/288 |
| 5,985,356 A | 11/1999 | Schultz et al. | 427/8 |
| 6,004,617 A | 12/1999 | Schultz et al. | 427/8 |
| 6,030,917 A | 2/2000 | Weinberg et al. | 502/104 |
| 6,034,775 A | 3/2000 | McFarland et al. | 356/364 |
| 6,045,671 A | 4/2000 | Wu et al. | 204/298.11 |
| 6,182,499 B1 | 2/2001 | McFarland et al. | 73/24.06 |
| 6,187,164 B1 | 2/2001 | Warren et al. | 205/81 |
| 6,248,540 B1 | 6/2001 | Weinberg et al. | 435/7.1 |
| 6,326,090 B1 | 12/2001 | Schultz et al. | 428/688 |
| 6,346,290 B1 | 2/2002 | Schultz et al. | 427/8 |
| 6,468,806 B1 | * 10/2002 | McFarland et al. | 436/518 |
| 6,514,764 B1 | 2/2003 | Willson, III | 436/37 |
| 6,627,571 B1 | * 9/2003 | Lugmair et al. | 502/2 |
| 2002/0176927 A1 | * 11/2002 | Kodas et al. | 427/8 |
| 2004/0028815 A1 | * 2/2004 | Castellano et al. | 427/282 |

FOREIGN PATENT DOCUMENTS

| | | | |
|---|---|---|---|
| EP | 1 129 773 A2 | 9/2001 | |
| WO | WO 96/11878 | 4/1996 | C01G/51/04 |
| WO | WO 98/14641 | 4/1998 | |
| WO | WO 98/15969 | 4/1998 | |
| WO | WO 98/16949 | 4/1998 | H01J/49/40 |
| WO | WO 99/19724 | 4/1999 | |
| WO | WO 00/29844 | 5/2000 | |
| WO | WO 00/58003 | 5/2000 | B01J/19/00 |
| WO | WO 00/43119 | 7/2000 | |
| WO | WO 01/68236 A2 | 9/2001 | B01J/19/00 |
| WO | WO 01/78889 A2 | 10/2001 | B01J/19/00 |

OTHER PUBLICATIONS

Hanak, J.J. "The 'Muliple–Sample Concept' in Materials Research: Synthesis, Compositional Analysis and Testing of Entire Multicomponent Systems." 1970. Journal of Materials Science. pp 964–971.

(Continued)

*Primary Examiner*—Timothy Meeks
*Assistant Examiner*—William Phillip Fletcher, III
(74) *Attorney, Agent, or Firm*—Russell G. Lindenfeldar

(57) ABSTRACT

Methods are disclosed for providing a library of composite compositions on a support. The method involves depositing one or more components onto the support on either discrete spaced regions of the support or as a continuous concentration gradients on the surface of the support. The composite samples can be removed from the support by drilling out portions of the coated support so as to yield individual composite tablets containing the support with one or more component layers thereon. By using this method, a vast number of composites can be made and tested simultaneously.

52 Claims, 8 Drawing Sheets

OTHER PUBLICATIONS

G.C. Moreland, R. Johnson, Smithsonian Contrib. Earth Sci.,1975, 14, 98–8, pp. 87–88.

I. Goldfarb, E. Zolotoyabko, A. Berner, D Shechtman. "Novel Sample preparation techniqure for the study of multicomponent phase diagrams." Materials Letters 21 (1994), pp 149–154.

K. Govindaraju and G. Mevelle, Journal of Analytical Atomic Spectrometry, 1987, 2, pp. 615–621.

R.B. van Dover, L.F. Schneemeyer & R.M. Fleming. "Discovery of a useful thin–film dielectric using a composition–spread approach." Nature. vol. 392. Mar. 12, 1998. pp. 162–164.

* cited by examiner

COMBINATORIAL SYNTHESIS

FIELD OF THE INVENTION

This invention is directed to a method for preparation of large numbers of composite materials suitable for combinatorial screening. Depositing individual components of the composites onto sheets using various coating techniques forms the composites. Either numerous discrete regions on the sheet are coated with a different composition, or large portions of the sheet are provided with one or more coatings which form continuous concentration gradients along one or more axes of the sheet. Composite samples containing one or more components attached to the sheet are then cut or otherwise removed from different regions of the coated sheet and screened for any number of useful properties including, but not limited to, physical, electrical, and chemical properties and any numerous subsets of such properties.

BACKGROUND OF THE INVENTION

Combinatorial Chemistry, also known as High Throughput Experimentation, is an emerging area that has impacted various fields. Although still evolving, the procedure is fully established in the pharmaceutical industry. There is increasing interest in applying such techniques in materials science since the combinatorial synthesis method can be a very powerful tool in increasing the rate of experimentation, and therefore, improving the possibility for making discoveries.

The discovery of new materials with novel chemical and physical properties often leads to the development of new and useful technologies. Over forty years ago, for example, the preparation of single crystal semiconductors transformed the electronics industry. Currently, there is a tremendous amount of activity being carried out in the areas of superconductivity, magnetic materials, phosphors, nonlinear optics and high strength materials. Unfortunately, even though the chemistry of extended solids has been extensively explored, few general principles have emerged that allow one to predict with certainty composition, structure and reaction pathways for the synthesis of such solid state compounds. Importantly, it is difficult to predict a priori the physical and chemical properties a particular composition and structure will possess.

Clearly, the preparation of new materials with novel or desired chemical and physical properties is at best happenstance with our current level of understanding. Consequently, the discovery of new materials is limited by the ability to synthesize and analyze new compounds or compositions. As such, there exists a need in the art for a more efficient, economical and systematic approach for the synthesis of novel materials and for the screening of such materials for useful properties.

One of the processes whereby nature produces molecules having novel functions involves the generation of large collections (libraries) of molecules and the systematic screening of those libraries for molecules having a desired property. An example of such a process is the humoral immune system which in a matter of weeks sorts through some $10^{12}$ antibody molecules to find one which specifically binds a foreign pathogen (Nisonoff, et al., *The Antibody Molecule* (Academic Press, New York, 1975)). This notion of generating and screening large libraries of molecules has recently been applied to the drug discovery process. The discovery of new drugs can be likened to the process of finding a key which fits a lock of unknown structure. One solution to the problem is to simply produce and test a large number of different keys in the hope that one will fit the lock.

Using this logic, methods have been developed for the synthesis and screening of large libraries up to $10^{14}$ molecules) of peptides, oligonucleotides and other small molecules. Geysen, et al., for example, have developed a method wherein peptide syntheses are carried out in parallel on several rods or pins (see, J. Immun. Meth. 102:259–274 (1987), incorporated herein by reference). Generally, the Geysen, et al. method involves functionalizing the termini of polymeric rods and sequentially immersing the termini in solutions of individual amino acids. In addition to the Geysen, et al. method, techniques have recently been introduced for synthesizing large arrays of different peptides and other polymers on solid surfaces. Pirrung, et al. have developed a technique for generating arrays of peptides and other molecules using, for example, light-directed, spatially-addressable synthesis techniques (see, U.S. Pat. No. 5,143,854 and PCT Publication No. WO 90/15070, incorporated herein by reference. In addition, Fodor, et al. have developed, among other things, a method of gathering fluorescence intensity data, various photosensitive protecting groups, masking techniques, and automated techniques for performing light-directed, spatially-addressable synthesis techniques (see, Fodor, et al., PCT Publication No. WO 92/10092, the teachings of which are incorporated herein by reference).

Using these various methods, arrays containing thousands or millions of different elements can be formed (see, U.S. Pat. No. 5,424,186, the teachings of which are incorporated herein by reference). As a result of their relationship to semiconductor fabrication techniques, these methods have come to be referred to as "Very Large Scale Immobilized Polymer Synthesis," or "VLSIPS™" technology. Such techniques have met with substantial success in, for example, screening various ligands such as peptides and oligonucleotides to determine their relative binding affinity to a receptor such as an antibody.

U.S. Pat. No. 5,985,356, issued Nov. 16, 1999, the entire content of which is herein incorporated by reference, discloses the combinatorial synthesis for making and testing an array of novel materials. This patent provides methods and apparatus for the preparation and use of a substrate having an array of diverse materials in predefined regions thereon. A substrate having an array of diverse materials thereon is prepared by delivering components of materials to predefined regions on the substrate, and simultaneously reacting the components to form at least two materials. Materials which can be prepared using the methods and apparatus of the present invention include, for example, covalent network solids, ionic solids and molecular solids. More particularly, materials which can be prepared include inorganic materials, intermetallic materials, metal alloys, ceramic materials, organic materials, organometallic materials, non-biological organic polymers, composite materials (e.g., inorganic composites, organic composites, or combinations thereof), etc. Once prepared, these reaction products can be screened in parallel or sequentially for useful properties including, for example, electrical, thermal, mechanical, morphological, optical, magnetic, chemical and other properties. As such, the patented invention provides methods and apparatus for the parallel synthesis and analysis of novel materials having new and useful properties.

In one embodiment of U.S. Pat. No. 5,985,356, a first component of a first material is delivered to a first region on a substrate, and a first component of a second material is delivered to a second region on the same substrate. Thereafter, a second component of the first material is delivered to the first region on the substrate, and a second component of the second material is delivered to the second region on the substrate. The process is optionally repeated, with additional components, to form a vast array of components at predefined, i.e., known, locations on the substrate. Thereafter, the components are simultaneously reacted to form at least two materials. The components can be sequentially or simultaneously delivered to predefined regions on the substrate in any stoichiometry, including a gradient of stoichiometries, using any of a number of different delivery techniques.

In another embodiment, a method is provided for forming at least two different arrays of materials by delivering substantially the same reaction components at substantially identical concentrations to reaction regions on both first and second substrates and, thereafter, subjecting the components on the first substrate to a first set of reaction conditions and the components on the second substrate to a second set of reaction conditions. Using this method, the effects of the various reaction parameters can be studied on many materials simultaneously and, in turn, such reaction parameters can be optimized. Reaction parameters which can be varied include, for example, reactant amounts, reactant solvents, reaction temperatures, reaction times, the pressures at which the reactions are carried out, the atmospheres in which the reactions are conducted, the rates at which the reactions are quenched, the order in which the reactants are deposited, etc.

In the delivery systems of the patented invention, a small, precisely metered amount of each reactant component is delivered into each reaction region. This may be accomplished using a variety of delivery techniques, either alone or in combination with a variety of masking techniques. For example, thin-film deposition in combination with physical masking or photolithographic techniques can be used to deliver various reactants to selected regions on the substrate. Reactants can be delivered as amorphous films, epitaxial films, or lattice and superlattice structures. Moreover, using such techniques, reactants can be delivered to each site in a uniform distribution, or in a gradient of stoichiometries. Alternatively, the various reactant components can be deposited into the reaction regions of interest from a dispenser in the form of droplets or powder. Suitable dispensers include, for example, micropipettes, mechanisms adapted from ink-jet printing technology, or electrophoretic pumps.

Once the components of interest have been delivered to predefined regions on the substrate, they are reacted using a number of different synthetic routes to form an array of materials. The components can be reacted using, for example, solution based synthesis techniques, photochemical techniques, polymerization techniques, template directed synthesis techniques, epitaxial growth techniques, by the sol-gel process, by thermal, infrared or microwave heating, by calcination, sintering or annealing, by hydrothermal methods, by flux methods, by crystallization through vaporization of solvent, etc. Thereafter, the array can be screened for materials having useful properties.

Similar to the formation of a large array of compositions as described in U.S. Pat. No. 5,985,356, is a technique for forming an array of different compositions, including metal alloys wherein the individual components that form the composition are applied by thin film deposition as continuous concentration gradients across a sheet. J. J. Hanak, "The 'Multiple-Sample Concept' in Materials Research: Synthesis, Compositional Analysis and Testing of Entire Multicomponent Systems", *Journal of Materials Science* 5 (1970) 964–971 discusses the development of multicomponent synthesis including the use of a technique of co-evaporating or co-sputtering two or more elements from different, physically separated sources onto a suitable substrate. In one experiment, almost the entire composition continuum of a given binary or ternary system was deposited on one substrate. Specimens made by the foregoing techniques have to be analyzed for chemical content point by point by existing chemical or physical methods. Thus the advantage gained by the synthesis technique was all but lost in the analytical methods. The article discloses that a unique computerized analytical method was developed based on the measurement of a simple extensive property common to all deposited films, namely, the thickness. In order to obtain analysis for the entire composition range the only required measurements are the two thickness measurements for a given binary system or three such measurements for a ternary system. The development of the computerized analysis is stated to have meant the removal of the main obstacle to the realization of the multiple sample concept. Goldfarb, et al., "Novel Sample Preparation Technique for the Study of Multiple Component Phase Diagrams", *Materials Letters* 21 (1994) 149–154, provides a technique for alloy sample preparation based on thin film deposition, for a study of binary and ternary compositions. Thin elemental wedge-shaped layers of the components were gradually sputtered in an alternating manner to form a multi-layered structure. The samples obtained had compositions which depended upon the location of the substrate. Such samples, containing differently composed Au—Ag—Cu alloys were heat treated to promote formation of stable phases. The alloys formed were studied by x-ray diffraction and various microscopic techniques. The article demonstrates the advantages of the disclosed method over conventional bulk-based methods. A similar approach was taken to evaluate alternative thin-film dielectrics as described in *Letters to Nature*, "Discovery of a Useful Thin-film Dielectric Using a Composition-Spread Approach", R. B. van Dover, et al., *Nature* (vol. 392) 12 Mar. 1998. In this article, a wide range of compositions were efficiently evaluated by using a technique of depositing a single film with a ternary composition spread on a sheet and evaluating the critical properties as a function of position on the sheet which is directly related to material composition using an automated tool, the continuous composition spread technique.

Different from new materials in which new chemical compounds are formed from reaction mixtures of distinct reaction elements or compounds, or alloys, which are solid solutions of two or more components, are composite materials, which typically comprise one, or more components arranged as unreacted mixtures or layers. Composite materials are widely used for industrial and consumer use and are formed based upon the idea that a mixture of components can yield a better property configuration than a single base component. Among the numerous objects which can be formed as composites, non-limiting samples include heterogeneous catalysts, adsorbents for gas or liquid separations and pigments. Heterogeneous catalysts, for example, are widely used for industrial processing and/or in consumer goods, such as, for example, as oxidation catalysts contained in catalytic converters of automobiles. As opposed to new compounds from deposited reactive layers, the chemical compositions which form the distinct deposited compounds of heterogeneous catalysts remain mostly distinct from the other compounds. The activity of particular catalysts, the selectivity to achieve the desired product, thermal, hydro and hydrothermal stabilities of the heterogenous catalysts often depend upon the distinct layered configuration of the deposited metal, metal oxide or other compounds as well as the distinct composition of each layer and/or thickness of each layer which are deposited to form the heterogeneous catalytic material. Moreover, often the heterogenous catalyst is supported on a metallic or ceramic support which although may be neutral with respect to the chemical reactants contacting the catalyst, may have a physical or chemical effect on the catalytic components in immediate contact or approximate to the support. Thus, for catalytic converters, cordierite honeycombs are typically coated with one or more washcoats of catalytic layers. It is not uncommon for the cordierite substrate to alter the catalytic properties of the layer or layers in contact or proximate contact with the substrate such that differences between contemplated and actual results achieved with the catalyst may disadvantageously exist.

The present invention is not intended to be limited to heterogeneous catalysts. Many base components are mixed with additives to adjust a variety of physical, chemical and/or electrical properties. Among non-limiting examples, are porous, crystalline adsorbents, which are combined with other major or minor phases to modify adsorption properties, improve throughputs, provide for improved selectivity of adsorbed components, etc. Pigment bases are provided with additives to improve color, luster, strength, flowability, etc. Plastic composites are formed to provide tailored physical properties, to provide thermal, UV, moisture stabilities, improved over the base resin.

Regardless of the use of the composite, there is usually a need to test different compositions, configurations of compositional layers and/or relative concentrations of the components with respect to each other. Accordingly, an enormous problem exists with respect to testing the numerous possible combinations of materials used to form a composite. The variables for making a composite are still huge even if the composition of the composite is known and selected inasmuch as the arrangement (configuration) of layers, if used, and/or concentration of the individual components with respect to the other components still need to be tested for the desired properties which are sought.

SUMMARY OF THE INVENTION

The present invention is directed into the preparation of "libraries" of composites. Large numbers of the composites can be screened to determine the effectiveness of the individual composite compositions.

The present invention provides methods for the preparation and use of a substrate having multiple samples of composite compositions provided thereon. The composite samples comprise one or more components coated onto a substrate in discrete regions of the substrate or in continuous concentration gradients covering large sections of the substrate and varying in concentration along one or more axes of the substrate. The substrate, if desired can comprise part of the composite. Such embodiment is particularly useful when the composite is a heterogeneous catalyst since the carrier for the catalytic layers often affects catalytic properties.

In accordance with this invention a substrate having a multiple number of diverse composite compositions thereon is prepared by delivering individual components to predefined regions on the substrate or by application of the components as continuous gradients thereon which vary in concentration across the substrate. Drying, if necessary, of the components placed on the substrate can take place simultaneously after application of each component or subsequent to application of the final component. After deposition of the components is complete, composite samples containing one or more components attached to the substrate can then be removed with or without the underlying substrate layer and screened for useful properties. As such, the invention provides methods for the parallel synthesis of large numbers of novel composites. Analysis can then be done on each removed composite sample.

In one embodiment for preparation of the libraries of composite compositions of this invention, a first component is placed on one or more discrete predefined regions of a substrate. Subsequently, one or more additional components having the same or different composition as the first component are applied to discrete regions of the substrate, which regions may be the same or different as the predefined regions of the substrate which were coated with the previous component. The components can be applied as discrete coating layers which remain intact or which blend together from a small extent to complete blending to a uniform mixture. What is formed is multiple samples of composite compositions placed at discrete, predefined locations on the substrate, each discrete region comprising a different composite composition from another with respect to either the number of components, the composition of the components, concentration of the components and/or thickness of the individual coating layers. If required, the samples of discrete component compositions can be heated to dry the deposited components such as to drive off solvents or carriers used in the coating process. A calcination step to convert metal salts to metal oxides or to burn off certain organic components may also be required. Any heating step, however, is not for the purpose of reacting one deposited layer or component with a contiguous layer, component, or the substrate to form a reaction product. In this invention, each coating layer or deposited component remains substantially intact and unmodified. Subsequent to application of the composite components and drying, if needed, the composite samples can be removed from the substrate or the discrete regions containing the composite samples can be removed along with the underlying substrate as a base layer and the individual composite samples analyzed for properties, e.g. chemical, physical, electrical, etc.

The delivery systems used to form the composite libraries of the present invention, deliver a small precisely metered amount of each component or layer onto each discrete region of the substrate. This may be accomplished using a variety of delivery techniques, either alone or in combination with a variety of masking techniques. For example, thin-film or thick film deposition in combination with physical masking or photolithographic techniques can be used to deliver various components or layers to selected regions on the substrate. Immersion and roll-coating with physical masking are also useful. Screen printing techniques have been found to be unexpectedly useful in providing the multiple coating layers in spaced and discrete region of the substrate. Moreover, using such techniques, the composite components can be delivered to each site in a uniform distribution, or in a variety of concentrations. Alternatively, the various composite components can be deposited into the discrete regions of interest from a dispenser in the form of droplets or powder. Suitable dispensers include for example, micropipettes, mechanisms adapted from ink-jet technology, or electrophoretic pumps. Once the components of interest have been delivered to the predefined regions on the substrate, the components as a mixture or in layers, if needed, can be activated by a number of different techniques such as heating, thermal oxidation, thermal reduction, hydrothermal treatment so as to convert metal salts to oxides or metal or simply to evaporate, combust or otherwise remove solvents or carriers used to apply the various coating layers. The composite samples are then removed such as by being cut out of the library along with the substrate to form individual sample "tablets". Thereafter, the tablets can be screened for the various chemical and physical properties and the like. Removal of the composite sample with the substrate is particularly useful in forming multiple catalyst samples.

An alternative approach to generate libraries of composite compositions, is a technique which generates a library of composite samples using one or more coatings in the form of continuous concentration gradients placed on the surface of a substrate. What is meant by "concentration", is the amount, e.g. weight or moles, of the component per a unit area of the substrate. By such technique, an infinite number of point compositions are formed. Accordingly, the potential number of composites resulting from the formation of gradients across a substrate surface is much higher than in the approach in which the composite samples are formed in individual discrete regions of the substrate. In this embodiment of the present invention in which gradients of coatings are applied across the substrate, the loading for a particular component increases in a uniform fashion as the coating moves across the 2-dimensional substrate sheet. The gradient can change along one or more axes of the substrate sheet. Further, a plurality of coating gradients can be applied across the substrate. Once a desired composition range is defined, it is possible to generate a library that contains all of the intermediate compositions. Samples with any specific composition can be removed from such a library by going to the appropriate location on the sheet. Once the uniform gradients are applied to the substrate, it is important to be able to calculate the composition of any specific spot of the gradient based on its location. A mathematical protocol has been devised for determining these compositions and is discussed in more detail below. Methods of generating the gradient coatings include, but are not limited to spray coating techniques, screen printing techniques, draw down methods, gravure roll and offset press coating techniques. The individual composite samples can be cut out of the sheet at any desired location and, again, the individual sample tested for physical and chemical properties and the like.

Often, the substrate that carries catalytic layers in a catalyst has an effect on catalytic properties. The present invention, therefore, provides a process for producing a library of heterogeneous catalysts in which the individual catalyst samples that are removed contain the deposited coating layers and the base or support. Thus, in accordance with a further embodiment of this invention, the support upon which is applied the various composite components such as catalytic layers, can be pre-cut or perforated into a plurality of shapes such as circles which are dispersed on discrete regions of the substrate. Upon application of the various catalytic layers in the discrete regions, the catalyst layers and underlying substrate can be readily punched out of the array into individual catalyst tablets wherein the catalyst comprises the various coating layers and the support. In a further embodiment, discrete portions of the support for holding the multiple composite samples can initially be completely cut from the base into a variety of shapes, e.g. circles, and the cut support itself supported during the coating operation by a second base layer placed underneath the cut support. Upon completion of the coating process, the underlying bottom layer can be removed and the composite samples dropped from the remaining support. If the base is perforated without a continuous cut, the samples can be lightly punched or picked out from the remaining substrate. It is also possible to use the pre-cut or perforated supports for supporting the gradient coatings.

Other objects and advantages of the present invention can be readily ascertained from the description of the invention which follows as well as from the appended claims.

DETAILED DESCRIPTION OF THE INVENTION

Figure 1:
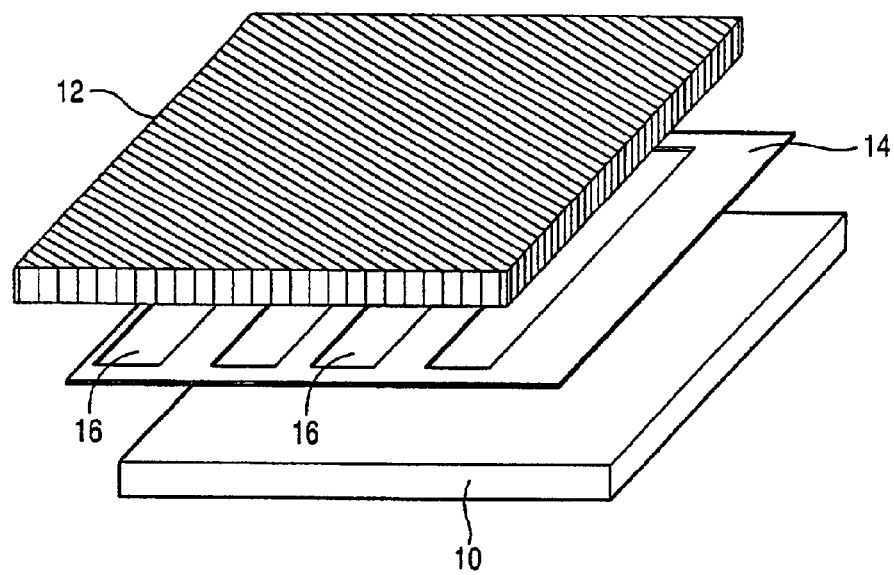
FIGS. 1 and 1A represent the use of a mask to apply a composite component onto discrete regions of a support.

In one embodiment of the present invention, a method is provided for the preparation of multiple samples of composite compositions provided on a plurality of spaced, predefined regions of a support. In a preferred embodiment, the substrate becomes part of the composite. This is useful in testing heterogeneous catalyst samples, for example, since often the substrate, which carries the active catalytic layers, has an effect on catalytic properties. Heterogeneous catalysts including the substrate are provided as individual catalyst samples which can be individually tested for catalytic properties as well as other chemical, physical, and electrical properties. The heterogeneous catalyst samples are provided by coating one or more catalytic layers onto the substrate in spaced, predefined regions whereby one region will have an overall catalyst composition comprising one or more layers of catalytic material which is different from the catalyst composition contained on other predefined regions of the substrate. The catalyst samples can be cut out from the discrete regions of the support as tablets and the individual catalytic tablets tested for desired properties.

The library of composites is not intended to be limited to forming samples of heterogeneous catalysts. The composite samples which are formed can be for any and all useful purposes. Additional non-limiting examples include catalysts, adsorbents, pigments, coatings, ceramics, glasses, sensors, electronic materials, optical materials, construction materials, molded plastic parts, etc.

Flat sheets made from a variety of materials can serve as a substrate for forming the library of composite components in the methods of this invention. Thus, the sheets can be made of ceramics, such as oxides or silicates, including, for example, alumina, zirconia, etc., and cordierite; non-oxide ceramics such as metal carbides and nitrides; metals, such as, for example, stainless steel, aluminum, etc.; glass; polymers; and composites of the listed materials. Porous as well as dense materials can be utilized. It is most useful if the substrate, whether rigid or semi-rigid, can be cut or perforated so as to yield individual sample tablets subsequent to the coating process and which can be tested for properties as described above. It is preferred that the substrate used be one that is compatible with the components or layers that are delivered to the substrate and can be used effectively in the environment in which the composite is to be used. For example, cordierite sheets are especially preferred as a substrate for heterogeneous catalysts since cordierite is known as a support for catalytic layers such as in automotive catalytic converters. Thus, cordierite sheets provided with multiple samples of various catalytic layers can mimic honeycomb monoliths, which are used in automotive catalytic converters.

The composite components which are applied to discrete, predefined regions of the substrate are typically metals and metal oxides which can be coated onto the substrate in the form of a solid, liquid, slurry or solution, including inks, pastes, gels, suspensions, or vapor phase. The component can be deposited onto the substrate by various coating techniques such as spraying, immersion, pouring, rolling, vapor deposition techniques, etc. Aforementioned U.S. Pat. No. 5,985,356 discloses numerous techniques for applying reactive components to form a combinatorial array. Such techniques can be readily used herein to form a library of composite compositions.

The types of materials that can be applied as coatings include but are not limited to:

(a) Oxides of metals and main group elements, including transition metal oxides such as zirconia, titania, manganese oxide, rare earth oxides such as ceria and lanthanum oxide; binary, ternary, and more complex solid state oxides and ceramic phases; various forms of alumina, silica, aluminosilicates and aluminophosphates.

(b) Natural and synthetic forms of aluminosilicate and silicate zeolites such as ZSM-5, Beta, zeolite Y, and ferrierite, various forms of molecular sieves such as aluminophosphates and titanosilicates; natural or synthetic clays and related minerals such as kaolin, attapulgite, talc, montmorillonite, and Laponite®.

(c) Non-oxide ceramics such as metal carbides and nitrides.

(d) Various forms of carbons such as activated carbon, carbon molecular sieves, graphite, fullerenes, carbon nanotubes, and carbon black.

(e) Various organic polymers, oligomers, or resins, such as polyethylene, polypropylene, polystyrene, polyamides, halo hydrocarbon polymers, polyesters, etc.

(f) Metals such as precious metals and/or transition metals deposited, mixed with, or exchanged into any support such as any of the materials described in (a)–(e) above. Examples of such phases include Pt/alumina, Pd/alumina, and Cu-ZSM-5.

The metals or metal oxides may also be initially applied as metal salts which can be reduced or oxidized to the desired metal or metal oxide layer. The types of metals, metal compounds or non-metallic components that can be applied are limited only to the extent of the periodic table of elements and accordingly, there are no further limitations as to the elements, compounds or polymers that can be used as components. It is this availability of vast numbers of materials and the indefinite combinations of the materials that can be prepared, especially when more than one composite component or layer is applied, that leads to the necessity and importance of finding a way of preparing and testing a vast library of composite samples.

Figure 1A:
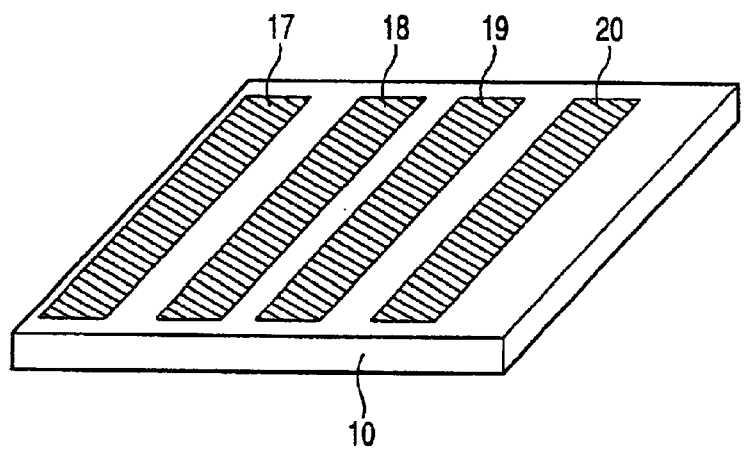

One very useful way of applying one or more composite components or layers on a predefined area of a substrate is shown in FIG. 1. As depicted therein, a flat substrate 10 is to be provided with a composite component layer which can be applied in the form of a fluid composition 12 which can be a solution or dispersion having a low viscosity such as an ink or higher viscosity such as a gel or paste, or even as a gas. Fluid 12 contains the component to be deposited such as, for example a metal or metal oxide. It my be useful to premix two or more components and apply the mixture as a component layer. If a liquid carrier is used, either water or organic solvents or mixtures thereof are appropriate. To ensure that the component is provided on the desired regions of the substrate, a mask 14 containing a plurality of openings as exemplified by openings 16 is placed so as to overlay the substrate 10. Upon application of the fluid composition 12, the removal of excess and the removal of mask 14 from the surface of substrate 10, the component is provided as a coating on the discrete regions on the substrate corresponding to openings 16 of mask 14. This is shown in FIG. 1A wherein component layers 17, 18, 19, and 20 are coated onto substrate 10 corresponding to the openings 16 of mask 14.

Figure 2:
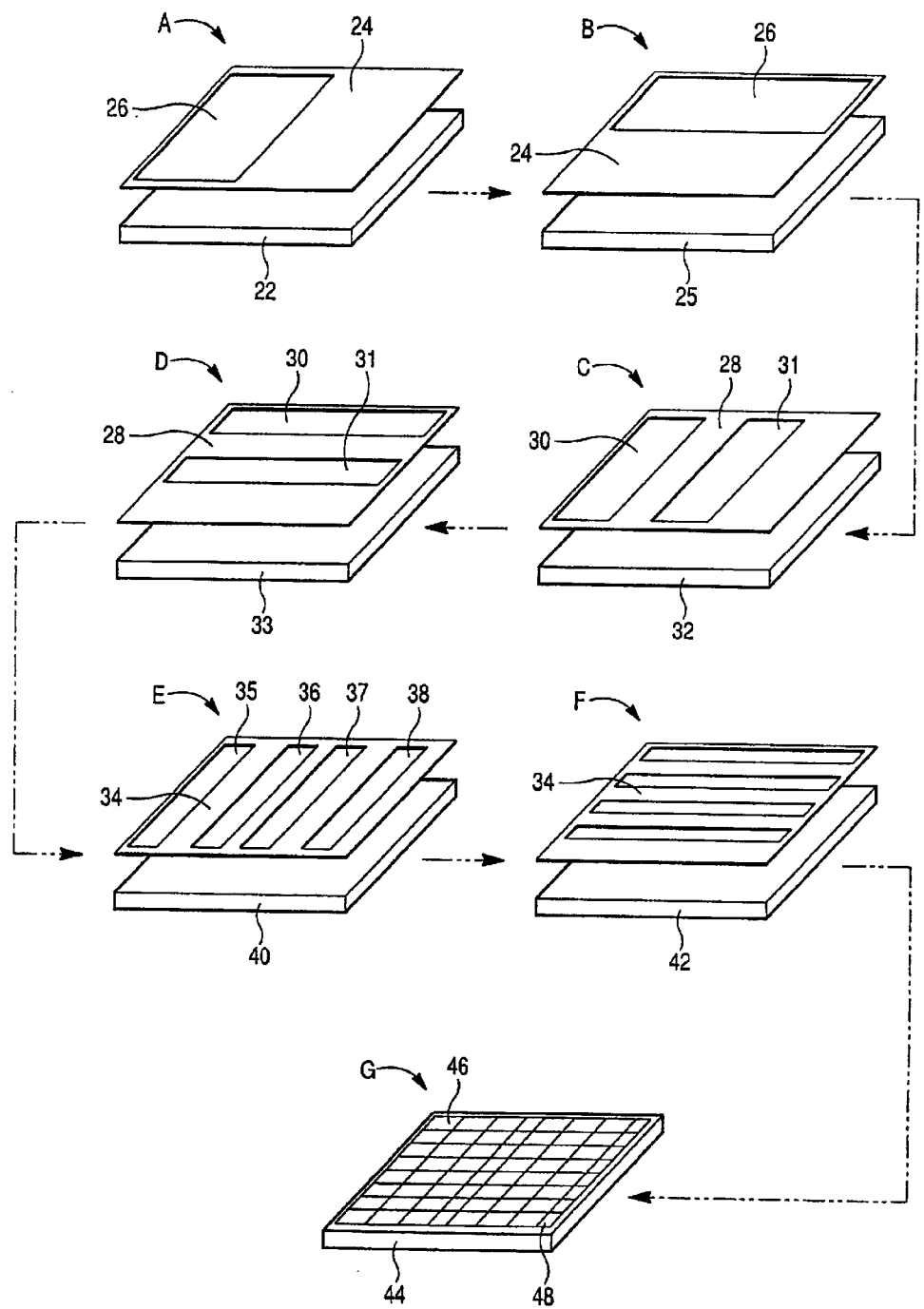
FIGS. 2(A–H) represent the use of three different masks to form an 8×8 grid of discrete regions on a support wherein each of the 64 discrete regions on the support has a different composite composition as shown in the side views of FIG. 2H.
Figure 2H:
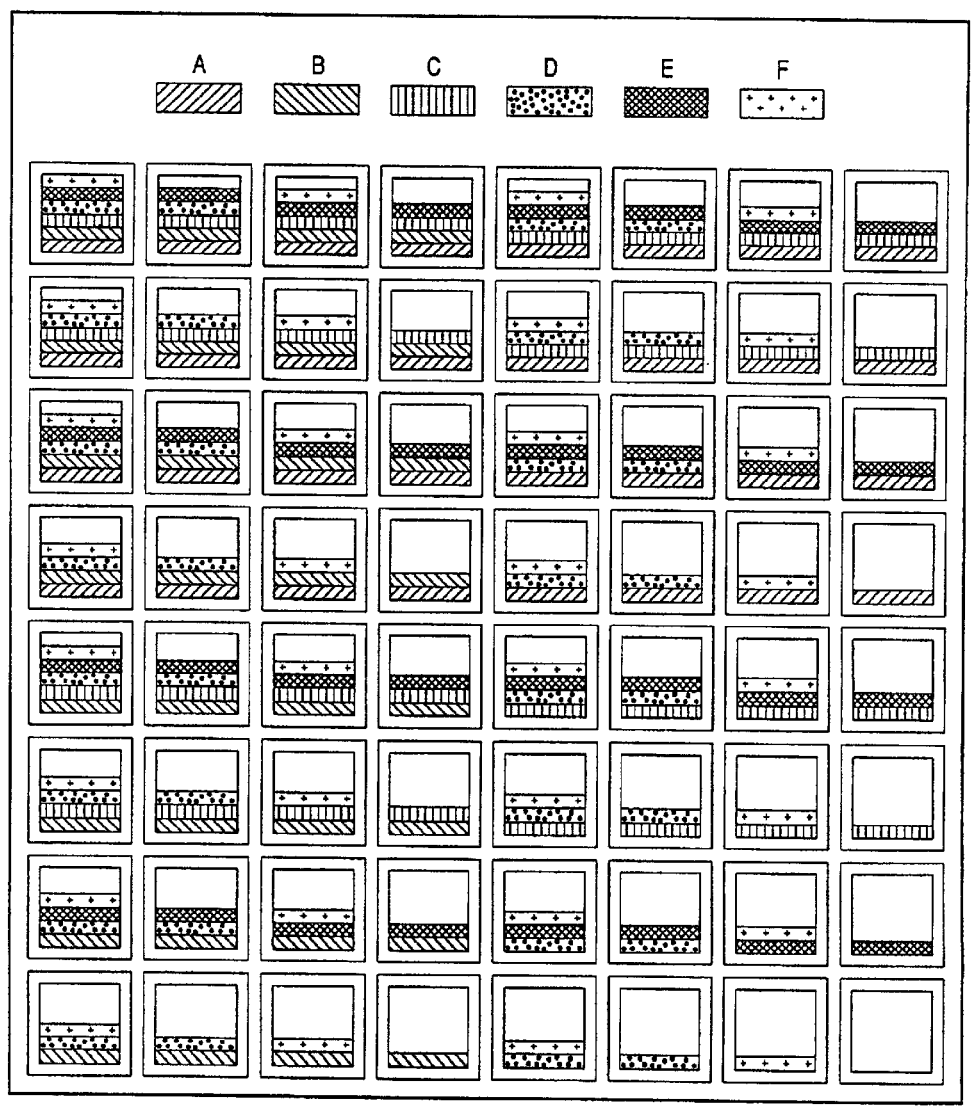

In order to provide the desired plurality of composite compositions on the substrate, a series of masks can be utilized, each mask overlaying the substrate or coated substrate prior to the application of the next layer. FIGS. 2A–2G illustrate the application of six component layers, some of which may be the same, to form an 8×8 grid of 64 predefined regions on the substrate which generate all of the possible combinations of a 6-variable system. As shown in FIGS. 2(A–G), by using three masks and, using each mask in two different orientations, six different components can be deposited onto the surface to result in the 8×8 grid. Initially, as shown in FIG. 2A, an uncoated substrate 22 is overlaid with a mask 24 containing one opening 26. Subsequent to the application of a coating layer (not shown) and drying (if necessary) of the layer, mask 24 is turned 90° and overlaid onto once coated substrate 25 whereupon a second layer can then be applied, FIG. 2B. FIGS. 2C and 2D represent the use of a mask 28 which contains two openings 30 and 31 which are again overlaid onto previously coated substrates 32 and 33 for application of layers three and four. As can be seen in FIG. 2C, the openings 30 and 31 are orientated perpendicular to opening 26 in FIG. 2B. Similarly, as shown in FIG. 2D, mask 28 is oriented or turned 90° from the orientation of mask 28 in FIG. 2C such that openings 30 and 31 are perpendicular to the direction of openings 30 and 31 in FIG. 2C prior to the application of an additional coating layer. FIGS. 2E and 2F represent the application of coating layers five and six wherein a mask 34 containing four openings 35, 36, 37 and 38 overlays substrate 40 which already contains four coating layers. In FIG. 2E, the mask 34 is oriented such that the openings 35–38 are now in a direction perpendicular to the direction of openings 30 and 31 as used during the application of the component layer in FIG. 2D. Subsequent to coating in FIG. 2E, mask 34 is now placed on substrate 42 which has been coated five times. The final sixth coat is applied through openings 35–38 of mask 34 in FIG. 2F where again the mask is turned 90° from the orientation used in FIG. 2E. What results is shown in FIGS. 2G and 2H in which substrate 44 which has been coated six times contains a grid of 64 different composite compositions. The composite sample in the upper left corner 46 will contain all six coatings while the sample in the lower right corner 48 will contain the substrate only without any coating layers. All other combinations of the six coatings would appear in the remaining samples. FIG. 2H illustrates the 64 different samples which are formed by the process depicted in FIGS. 2A–2F. While FIG. 2H illustrates the component deposits as distinct layers, it is within the scope of this invention that the deposited component layers can blend with any contiguous layer from a state of partial blending to a state of uniform mixture. It is important, however, that the deposited components remain as mixtures if blending does occur or is desired, and not as a reaction product between two or more deposited components.

Obviously, other masking configurations can be used to form the multiple composite compositions on the support. FIGS. 2A–2H represent one possibility of mask use and is not intended to limit the present invention. In the above described 6-variable example, as shown in FIGS. 2A–2H, each catalyst coating is of a unique composition. It is important to point out that parameters other than coating composition can serve as a variable. For example, some compositional libraries may contain fewer number of unique compositions but have variations in the thickness of a coating component. The simplest way to handle such a variation is to use the same coating with two subsequent masks, thus providing a larger amount of the coating to some of the predefined regions. Alternatively, by using other mask designs, it is possible to treat each quadrant of an the substrate as separate libraries, i.e. prepare four 16-member libraries. The latter approach allows for the preparation of the same number of unique samples on the ceramic sheets, but work with fewer numbers of variables for each library. Further, the amount of coating, deposited in solid or liquid form, need not be uniform across the substrate or even across a specific region of the substrate. An intentional gradient could be introduced as one moves from one side of the substrate to the other. The result is a step-wise concentration gradient across the substrate from one discrete region to the next. In addition to the method described with respect to FIGS. 2A–F, alternative approaches can be used to deliver the various coatings on the flat substrate. Such delivery methods are discussed above in the "Summary of the Invention" and in aforementioned U.S. Pat. No. 5,985,356. For example, in the process described above, in which a plurality of physical masks are used to conform the coatings to predefined regions on the substrate, the coatings can be applied as a fluid such as by spraying, immersion, pipetting, or roll coating. In addition, electrophoretic and vapor deposition methods can be used with physical masking as shown in FIG. 2. Screen printing techniques are very useful methods of coating specific regions of the substrate with the composite components or layers. In screen printing, a design or surface pattern coating is produced on a substrate by forcing ink through a fabric mesh screen that has been partly blocked out or masked to reveal only the pattern to be applied. The ink is moved across the imaged screen by a squeegee. Hydraulic pressure created by the leading edge of the squeegee forces ink through the unblocked or unmasked portions of the screen onto the substrate below. The variables in the screen-printing process are numerous and can be optimized for print definition, reproducibility, and deposition uniformity. Almost any component material can be deposited by screen printing, and as well, any substrate material can be screen printed, including paper, metal, plastics, ceramics, and glass.

If metals are to be applied to the substrate, deposition can be achieved from vapor deposition, powder or slurry of metal or metal oxides, supported metal or metal oxides, as well as the applications of metal salts dissolved in water or other solvent or metal salts impregnated onto carrier particles. The metal salts can be converted to metals or metal oxides by a subsequent reduction or oxidation step after application of the solution, or upon deposition of the metal salt/carrier particles and removal of the solvent or slurry mediums. A particular useful method of applying metals is to first impregnate or otherwise deposit a metal or metal salt on a porous carrier particle such as alumina. The metal/alumina particles can then be applied on predefined regions of the substrate or as continuous gradients. Pt/alumina or Pd/alumina are non-limiting examples of metal/carrier components. If the alumina carrier or other porous carrier is impregnated with metal salts, the metal salt/carrier coatings can then be treated subsequent to deposition to oxidize or reduce the various metal salts to metal oxides or metals, respectively. Treatment can be immediately after each layer is applied or after all layers of metal salts have been applied.

In the process of driving off solvents or liquid carriers and/or converting the metal salts to metals or metal oxides by thermal treatment, it is important that such heat treatment is not so severe as to cause a substantial reaction between the individual metal components or layers with other components or layers. Thus, while two metals or metal salts may be applied, subsequent heat treatment should still yield two different metal compounds whether as pure metal or metal oxides. Substantial reaction between two metal components or oxides to form a third different metal, metal alloy, or oxide component is to be avoided. Thus, in accordance with this invention, any treatment of the coated substrate should not yield a substantial reaction between deposited composite components. What is meant by not yielding a substantial reaction is that at least 80% wt. of the deposited layers or components should remain unreacted with any other deposited component or layer. Preferably, at least 90% of the deposited components or layers remain unreacted with other layers, and most preferably, greater than 95 weight percent of the deposited layers should remain unreacted with other deposited components or layers.

An important exception to the discussion immediately above with respect to forming composites and not new reacted compounds from two or more applied components is when the deposited sample is cut from the substrate sheet along with the underlying substrate. Thus, in this embodiment of the invention, the individual components are deposited on the substrate sheet in either predefined discrete areas or as continuous concentration gradients, but with the exception that the deposited components can react with each other or the substrate to form new compounds. For example, a variety of aluminosilicate zeolites and the like can be formed directly on a carrier substrate surface such as alumina, silica-alumina, cordierite, etc. Once the new compounds are formed on the substrate surface, the new compounds along with the underlying carrier substrate can be removed by cutting, coring or the like, which is specifically described below. This embodiment allows the testing of a library of compounds, which are most useful when contained on a support. While the uses of such compounds are unlimited, specific examples include catalysts, adsorbents, and pigments.

Figure 3A:
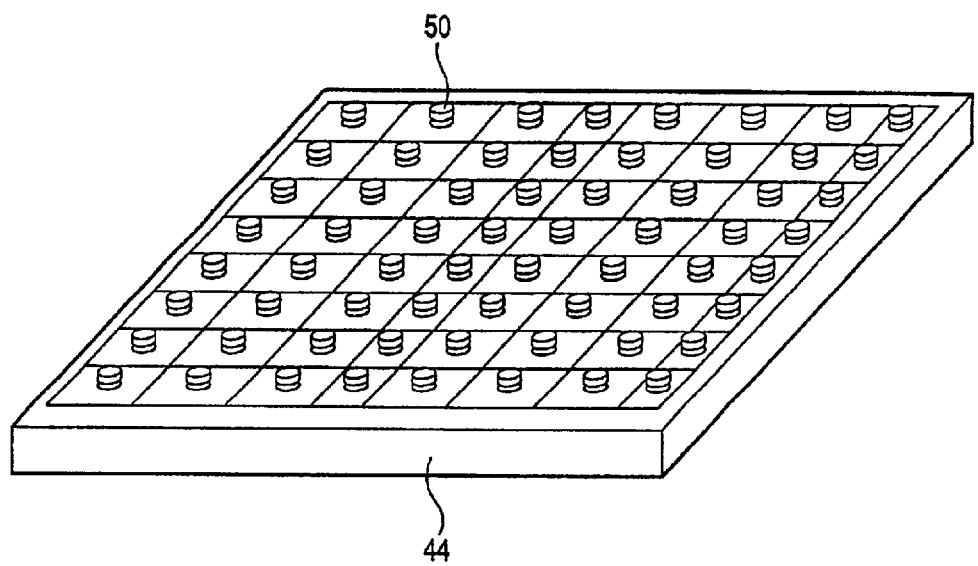
FIGS. 3A and 3B represent, respectively, the removal of the composite samples by coring from the support after coating and the individual composite "tablets" which are formed and which can be sampled for properties.
Figure 3B:
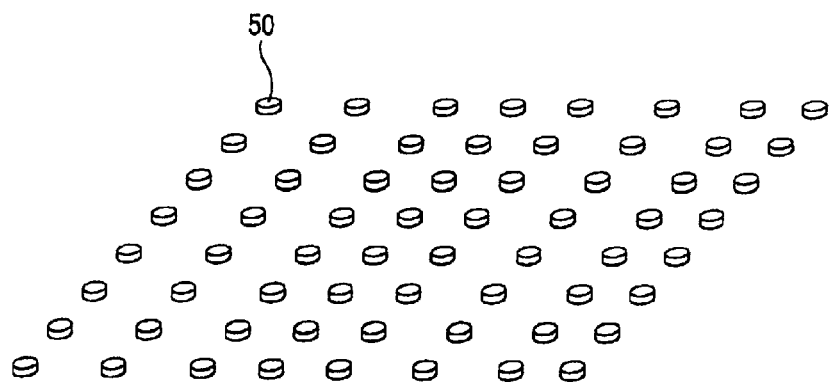

Once coated, the flat substrate can be heat treated as described above so as to remove liquid carriers, solvents, to convert metal salts, temper and the like. Once heat treatment is completed, the substrate should contain discrete regions each of which contains one or more deposited coating layers or composite compositions wherein each composition is different from other compositions in different predefined regions of the substrate. At this point, the composite samples can be cut out of the library so that the individual composition can be tested. As shown in FIG. 3A, an 8×8 array such as that formed in FIG. 2G and containing a substrate 44 and sixty-four separate composite samples, such as sample 50 are cut out of the predefined grid region. While FIG. 3A shows that the composite sample that is cut out is circular, in principle, any shape is possible, for example, square, rectangle, triangle, etc. Once the composite samples 50 are cut out from the coated substrate 44, the individual samples 50 as shown in FIG. 3B can then be tested for a variety of properties. It should be understood that the composite samples can be removed with or without the underlying substrate for testing, or tested while the samples remain intact on the substrate. Cutting the samples such as by coring out the samples and the underlying substrate is very useful in testing for desired properties. Further, more than one sample with the same composition can be removed by the cutting or coring procedure.

Evaluation of the composite samples may consist of any type of electronic, optical, physical, or chemical testing. For heterogeneous catalysts this involves contacting the sample with one or more reactive compounds at certain conditions (e.g. flow rate, concentration, temperature, contact time, etc.) and evaluating the extent and nature of the reactivity of one or more of the reactive compounds by techniques such as mass spectrometry, infra-red spectrometry, gas chromatography or any other suitable and useful method. Typically, properties of the catalyst such as activity, selectivity, stability, rate constants, activation energies etc. may be determined.

The substrate that is preferably used in the above method is flat, but may take on a variety of alternative surface configurations. Regardless of the configuration of the substrate surface, it is important that the components deposited in the individual predefined regions of the substrate be prevented from moving to adjacent regions. Most simply, this can be ensured by leaving a sufficient amount of space between the regions on the substrate so that the various components cannot interdiffuse between regions. Moreover, this can be ensured by providing an appropriate barrier between the various regions on the substrate. A mechanical device or physical structure can be used to define the various regions on the substrate. For example, a wall or other physical barrier can be used to prevent the components in the individual regions from moving to adjacent regions. Alternatively, a dimple or other recess can be used to prevent the components in the individual regions from moving to adjacent regions.

Instead of forming multiple samples of different composites on a continuous substrate sheet, several smaller substrate sections can be formed to test processing conditions on identical compositions. The size and number of these sheets can vary significantly depending on the particular experiment. In the case of the ceramic substrate sheet, these smaller sections can be easily cut from running lengths of tape cast ceramic, which comprises ceramic particles mixed within an organic binder. Once cut, the tape cast sheet can be fired to remove binder and provide additional sintering of the ceramic particles. Ideally, these sections are placed in a special platform, allowing each piece to be firmly held in place. The entire surface, corresponding to all of these pieces, will then be coated with the same ingredient(s). Once coated, these identical pieces are removed and treated under various conditions. The result is the same coating exposed to a variety of conditions. For example, the samples could be placed in a heating device that has a specific gradient in temperature as a function of location. A simple approach for achieving this thermal gradient is by placing each piece at specific regions inside a tube furnace. Upon heating these pieces, the final array would represent the entire range of thermal treatments. Other types of conditioning environments can be applied to obtain this type of combinatorial effect. In regards to different temperature treatments, it may also be possible to treat the larger sheet containing the entire library in a device that provides local heat to specific regions, for example using lasers.

In the embodiment described above, the library of composite compositions, which is formed, will comprise a finite number of composite samples which can be deposited on the substrate sheet. While vast numbers of composites can be deposited, the individual composite sample must be large enough to be effectively tested for properties, thus limiting the number of samples which can be formed on a substrate sheet. Further, while a step-wise gradient of concentration or compositional changes can be made across each of the predefined regions of the sheet, a vast continuum between a desired concentration range is not readily achieved. Accordingly, in an alternative embodiment to providing the library of composite compositions as coatings on discrete, predefined and spaced regions of the substrate is to form one or more of the component coatings as a continuous gradient across the whole of the substrate. The gradient can be with respect to concentration or loading of a particular component or may vary in compositional differences. By applying a coating gradient across the substrate, it is possible to generate a composite library that contains all of the intermediate compositions or concentrations between a desired compositional or concentration range. Samples with any specific composition within the desired range can be tested from such a library by going to a specific location on the substrate sheet and testing at such location or cutting out the sample from the coated sheet. Thus, libraries of composite compositions with an exhaustive range of compositions can be prepared for one-component as well as multi-component compositions. Several overlapping gradients can be prepared to mimic complex multi-dimensional phase diagrams.

Figure 4:
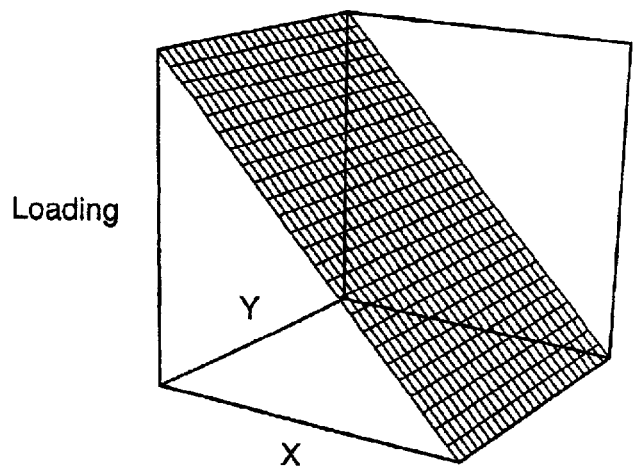
FIG. 4 represents a plot illustrating the application of a component coating layer in a concentration gradient, wherein the component loading changes only along the x-axis of the support.
Figure 5:
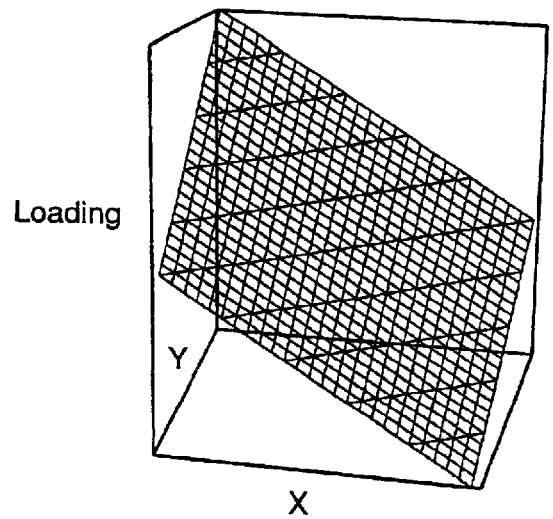
FIG. 5 also represents a plot showing the application of a component coating layer in a concentration gradient across the support, wherein the minimum component loading occurs at a corner of the support and increases as a function along both the x and y axes of the support.

This embodiment of the invention where continuous gradients of coatings are applied across the substrate are shown in FIGS. 4 and 5 where the loading for a particular composite component increases, in a continuous fashion as the gradient moves across a two-dimensional sheet. The plots in FIGS. 4 and 5 show two possible configurations of useful gradient coatings. In the first configuration shown in FIG. 4, the loading of a deposited component is increased as the gradient moves across the x-axis of the substrate sheet. In this case the loading changes only along the x-axis. In the second configuration shown in FIG. 5, the minimum loading occurs at the corner of the sheet and increase as a function of both x and y. The coatings with continuous gradient concentrations can be prepared as either single-component or multi-component systems. Examples of libraries with these gradient coatings include the following: (1) Uniform coatings of one or more components can first be placed on the substrate sheet. In such case the composition of the entire surface would be the same. Subsequent to the application of the uniform coating, one or more gradient coatings such as those described above and with respect to FIGS. 4 and 5 could be placed on top of the base coat. (2) The configuration of FIGS. 4 and 5 may be prepared as a single-component system to examine the effect of concentration of a particular component on a composite. Such a technique is even more powerful when two different gradients are placed on the same surface. The minimum loading for the first component can be at one corner of the sheet while the minimum loading for the second component may be at either a neighboring corner or at the opposite corner of the sheet to create different combinations of the two components. Alternatively, the patterns for the two components may overlap one another, i.e. the minimum for both would occur at the same corner. (3) The configuration of FIG. 4 can also be used to place two different gradient coatings. Three unique orientations of the second gradient relative to the first are possible: (a) the minimum loading of the second component occurs at the same location as the minimum of the first component, therefore as the gradients move across the sheet, loading for both components increase, (b) the minimum loading for the second component occurs at an edge that is adjacent to the edge for the minimum loading for the first component. Therefore, the two patterns are 90° off relative to each other. (c) The minimum loading for the second component occurs at an edge that is opposite of the edge of the minimum loading for the first component, and therefore, the two patterns are 180° off relative to each other. While the libraries are not limited in terms of the numbers of components that can be applied, the gradient technique is quite powerful to yield a vast number of composite compositions even when using only one or two deposited components. The configuration as above described are just a few of the possible ones which can be applied. The present invention is not intended to be limited to the specific patterns described. One of ordinary skill in the art could readily conceive of alternate configurations for applying one or more gradient coatings.

Delivery of the components as continuous gradients across the surface of the substrate can be achieved by several methods. One useful method is a spray-coating process. A spray gun is oriented at an angle relative to the target and at one end of the target, thus resulting in higher coating loadings at locations closer to the spray gun and decreasing loadings with increasing distance. An additional approach takes advantage of a fine mesh screen that is placed between the spray gun and the target. Some of the coating remains on the screen and thus, does not reach the target creating the concentration gradients. By placing the screen at an angle relative to the gun, varying amounts of the coating are blocked by the screen depending on location and a gradient loading is generated on the target. Relative movement and varying the speed of the movement between the spray gun and target may be achieved using a variable speed motor to deliver gradient coatings.

Figure 8:
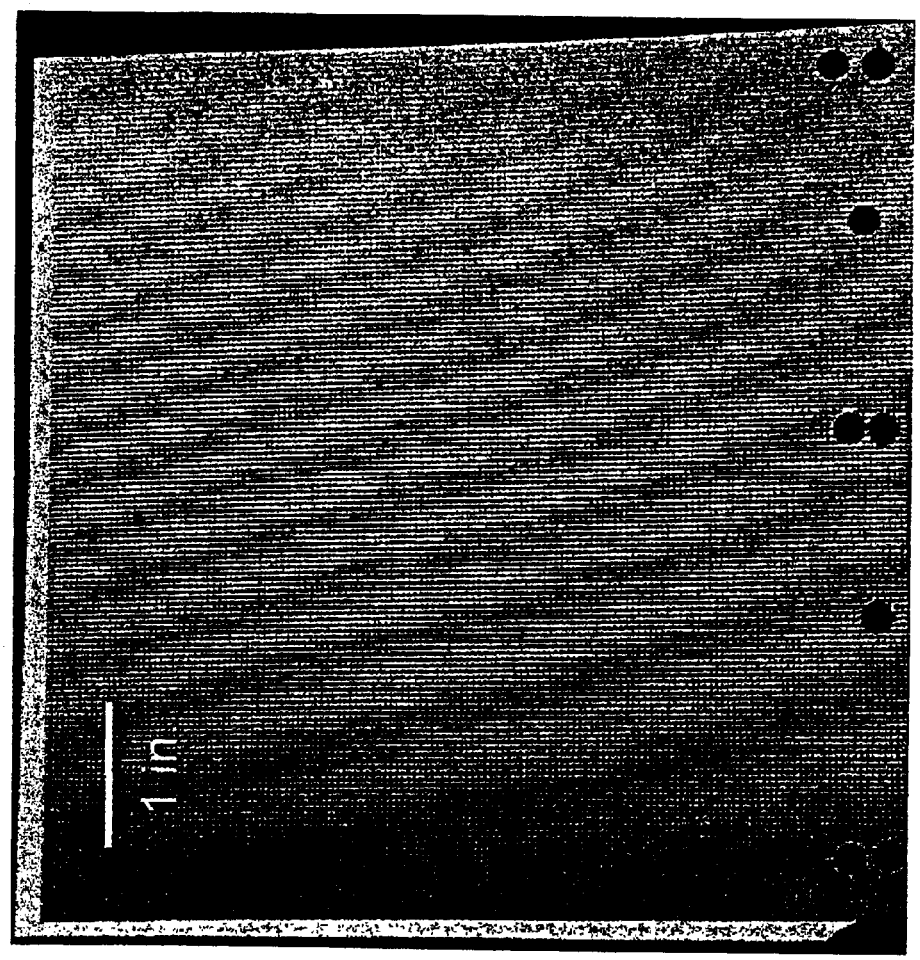
FIG. 8 is a photograph of a Pt/alumina coating on cordierite in the form of a continuous concentration gradient as depicted in FIG. 4.

The use of screen printing is a particularly useful technique to form gradient coatings. The appropriate screen to deliver a gradient coating can be produced by photolithographic techniques known in the art. FIG. 8 is a photograph of a Pt/alumina coating on a cordierite substrate coated by a screen printing process to apply a gradient of Pt/alumina along the x-axis of the cordierite substrate. The movement of a draw-down bar across a surface to vary the coating thickness, and gravure roll coating are additional methods that can be used to form coating gradients across the substrate surface.

Once the gradient coatings have been applied to the substrate in the desired manner, it is important to be able to calculate the composition of any given spot on the gradient based on its location. A mathematical protocol has been devised for determining these compositions depending upon the coating gradient protocol which has been used. Representative calculations appear below in conjunction with FIGS. 7(A–F).

In all of the following calculations, minimum loading for each component occurs at a corner or edge of the square sheet, and increases at a constant rate along one of the axes or the diagonal. The value for the minimum and maximum loadings for each component are required at the onset. The following equations show six scenarios and the corresponding equations to determine the final composition.

Definitions:

Composition (x,y) means the composition at location x,y on the substrate sheet. Its actual value would correspond to the total loading at location x,y.

$A_{min}$, $B_{min}$, ... minimum loading for component A, B, etc.
$A_{max}$, $B_{max}$, ... Maximum loading for components A, B, etc.
$X_{max}$, $Y_{max}$ Length of the x or y axes.

Figure 7A:
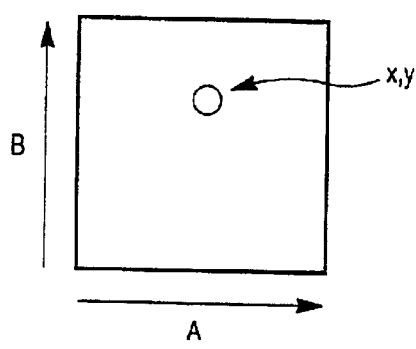
FIGS. 7A–7F represent typical configurations of composites using multi-layered gradient component coatings, wherein arrows A and B represent increases in the component concentration and x, y represent the coordinates of the desired composite samples, the composition of which can be determined by the equation depicted for each figure as set forth below.

FIG. 7A: corresponds to two gradient coatings A and B which have a minimum loadings at adjacent edges of the substrate sheet and wherein the respective loadings increase from the edge along either the x or y axis, respectively, and away from a common corner of the sheet.

$$\text{Composition}(x, y) = \left[A_{\min} + \left((A_{\max} - A_{\min})\frac{x}{x_{\max}}\right)\right] + \left[B_{\min} + \left((B_{\max} - B_{\min})\frac{y}{y_{\max}}\right)\right]$$

Figure 7B:
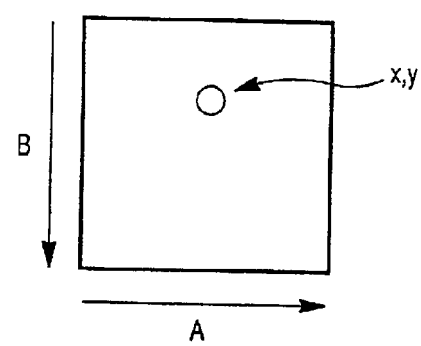

FIG. 7B: corresponds to two gradient coatings A and B which have a minimum loadings on adjacent edges of the substrate sheet and wherein the loadings increase from the respective edges along either the x and y axis respectively.

$$\text{Composition}(x, y) = \left[A_{\min} + \left((A_{\max} - A_{\min})\frac{x}{x_{\max}}\right)\right] + \left[B_{\max} - \left((B_{\max} - B_{\min})\frac{y}{y_{\max}}\right)\right]$$

Figure 7C:
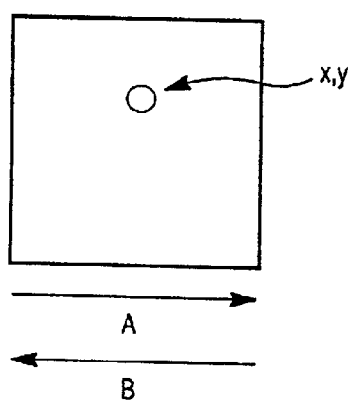

FIG. 7C: corresponds to two gradient coatings that have minimum loadings on opposite edges of the substrate sheet and wherein the prospective loadings increase in opposite directions along one axis of the sheet.

$$\text{Composition}(x, y) = \left[A_{\min} + \left((A_{\max} - A_{\min})\frac{x}{x_{\max}}\right)\right] + \left[B_{\max} - \left((B_{\max} - B_{\min})\frac{x}{x_{\max}}\right)\right]$$

Figure 7D:
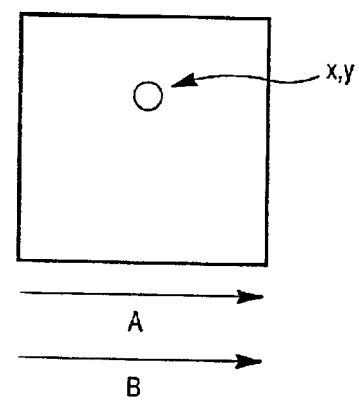

FIG. 7D: corresponds to two gradient coatings which have minimum loadings along the same edge of the substrate sheet and wherein the loadings A and B increases from such edge along one axis along the sheet.

$$\text{Composition}(x, y) = \left[A_{\min} + \left((A_{\max} - A_{\min})\frac{x}{x_{\max}}\right)\right] +$$
$$\left[B_{\min} + \left((B_{\max} - B_{\min})\frac{x}{x_{\max}}\right)\right]$$

Figure 7E:
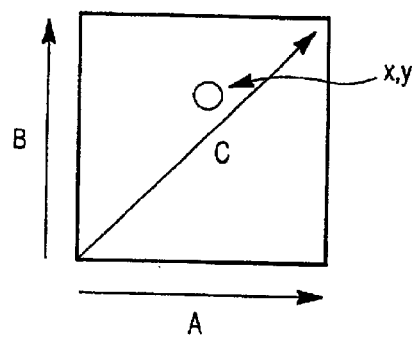

FIG. 7E: corresponds to three gradient coatings A, B and C wherein the minimum loadings for coating A and B are at adjacent edges of the sheet and wherein the loadings increase in the direction of the arrows along one axis of the sheet for each coating. The third coating C has a minimum loading at the corner between the adjacent edges and has a loading increase along diagonal between the x and y axes.

$$\text{Composition}(x, y) = \left[A_{\min} + \left((A_{\max} - A_{\min})\frac{x}{x_{\max}}\right)\right] +$$
$$\left[B_{\min} + \left((B_{\max} - B_{\min})\frac{y}{y_{\max}}\right)\right] +$$
$$\left[C_{\min} + \left((C_{\max} - C_{\min})\left(\frac{\sqrt{2\left(\frac{x+y}{2}\right)^2}}{\sqrt{x_{\max}^2 + y_{\max}^2}}\right)\right)\right]$$

It should be noted that the scenarios listed above are provided only as examples, and there are additional configurations for creating multi-component gradient coatings. For example, in all of the examples shown, it is possible to have one or more additional components that are coated at a uniform loading throughout the sheet.

Figure 7F:
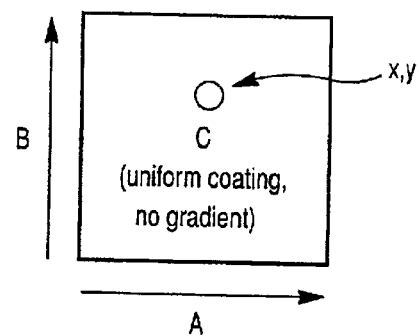

FIG. 7F: corresponds to gradient coatings A and B as in FIG. 7A and a uniform coating C.

$$\text{Composition}(x, y) = \left[A_{\min} + \left((A_{\max} - A_{\min})\frac{x}{x_{\max}}\right)\right] +$$
$$\left[B_{\min} + \left((B_{\max} - B_{\min})\frac{y}{y_{\max}}\right)\right] + C_{\max}$$

$C_{max} = C_{min}$

Figure 6:
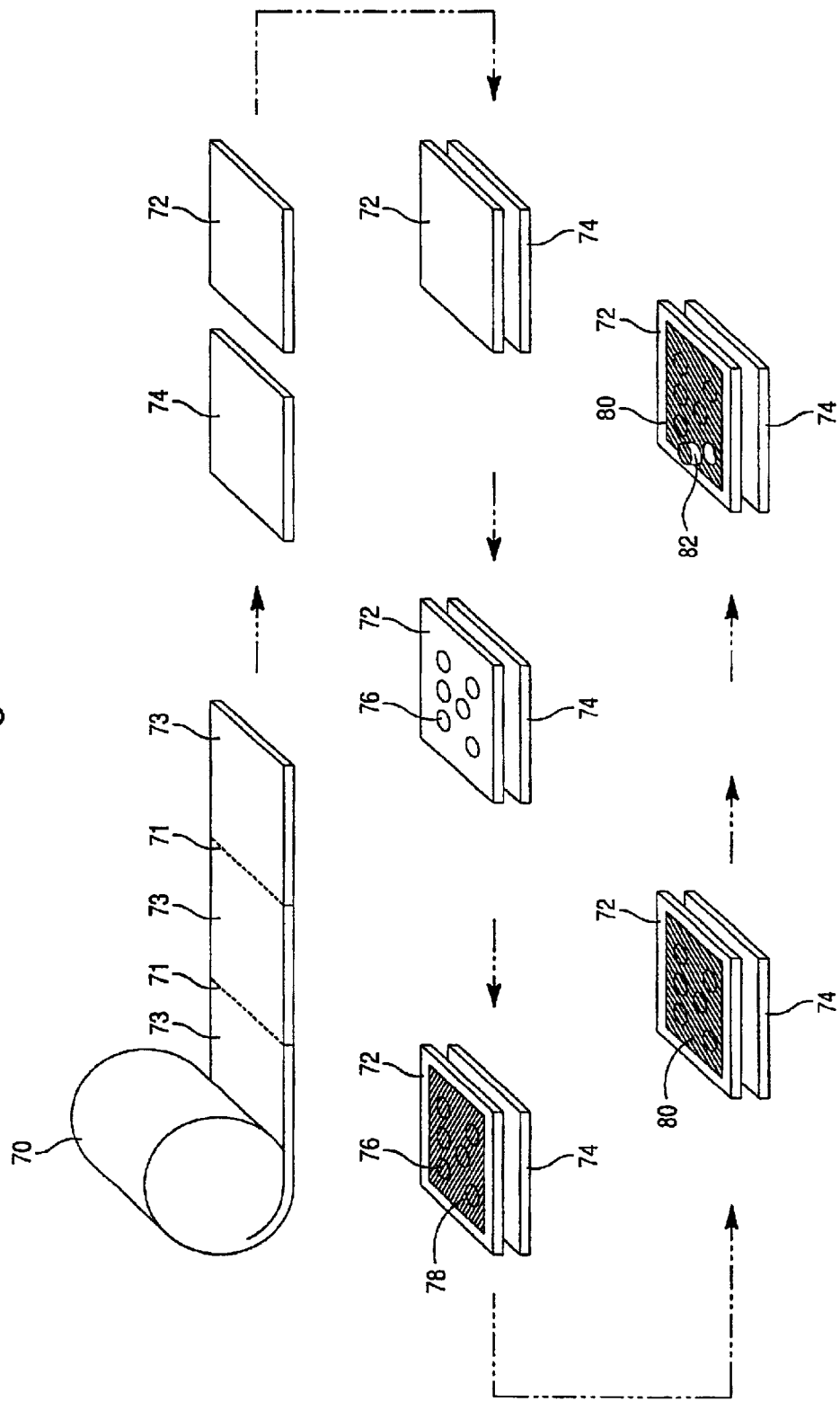
FIG. 6 represents one embodiment of the process of this invention wherein the coating layers are applied to rolled and pre-cut sheets and the coated samples removed from the cut portions of the sheet.

FIG. 6 represents a method of forming the libraries of composites of this invention, by either embodiment, that being by either the application of the coating layers on predefined discrete regions of the substrate or by utilizing one or more gradient coatings across the surface of the substrate. Referring to FIG. 6, a roll 70 of tape cast ceramic such as cordierite can be provided perforations 71 by any known manner to divide roll 70 into a plurality of individual substrate sheets 73. A tape cast ceramic contains a ceramic phase and a binder, such as a polymer or other binder source. The binder is burned off upon firing to provide the pure ceramic sheet. The sheets 73 are eventually cut along the perforations into separate substrate sheets 72 and 74. Prior to heat treatment, the tape cast ceramic sheets are relatively soft and are able to be cut or perforated by a sharp device. In FIG. 6, the cut sheets, 72 and 74 are stacked one on top of the other and while still containing binder, a sharp device can be pressed into the sheet, e.g. a cylindrical tube with a sharp edge would result in a perforated circle as indicated by reference numeral 76. A plurality of these perforations 76 can be formed throughout the surface of the substrate sheet 72. The substrate sheet 74 acts as a base layer so as to hold the perforated sections 76 in place within substrate sheet 72 prior to and during the coating process. Once the tape cast sheet is perforated, the sheet is fired to remove the binder, harden and densify the substrate sheet 72. Subsequent to firing, one or more coating layers can be applied to the top surface of substrate 72 by the methods described above. Thus, discrete regions of the substrate sheet 72 can be coated with one or more coatings or the whole surface of substrate sheet 72 can be coated with one or more gradient coatings. The coatings are represented by reference numeral 78 in FIG. 6. After coating, any solvents or carriers for the coatings can be removed as by heating. Further, any metal salts can be converted to their respective metals or metal oxides by a thermal process and such final coating is designated as reference numeral 80 in FIG. 6. Once the coatings are dried and converted to the desired phases, precut samples containing the base 72 and coating 80 can be removed as samples 82. Various cutting devices can be used to pre-cut the desired sample shapes in the tape cast substrate 72. Thus, instead of a sharp-edged tube as described above, a variety of templates can be used to make various perforated images onto sheet 72. Further still, the base sheet 74 which acts to hold the pre-cut samples in place in sheet 72 may be of the same material or a different material such as a different ceramic, metal, or even plastic layer. The purpose of the base 74 is to ensure that the pre-cut spaces remain in place during the coating process.

EXAMPLES

General

For the following examples, ceramic sheets obtained from Mistler (Morrisville, Pa.), were made from a cordierite powder mixed with a binder and tape-cast into a 6½" voll with a thickness of 0.047". These squares subsequently require a heating procedure to both remove the binder and provide rigidity to the piece. The cordierite sheets were placed onto a flat surface lightly dusted with powdered cordierite, and placed into a furnace with the following profile: room temperature to 932° F. over 1–6 hours, hold for ½ hour, ramp to 2100–2300° F. over 1–7 hours, hold for 0.5–12 hours, then cool slowly to room temperature. Longer heating times than those listed here are generally acceptable.

Examples of other tapes useful for this application are a 100% alumina tape and a 96% alumina/4% glass (magnesium aluminum silicate). An alumina marketed under Alcoa A-16SG is useful. The alumina tapes have a similar thickness to the cordierite tapes. The 96% alumina tapes range in thickness from 0.047" to 0.050". The 100% alumina tape requires a higher temperature, e.g. 2250–2650° F.

A screen printing ink is defined as a specific formulation consisting of a powder (in this case, a catalyst or other type of active material), a carrier solution, and a few additives that result in a product with high-quality screen-printing properties. A carrier is defined as a suspending agent for the solid component of a screen printable ink. The carrier typically makes up the bulk of the key properties of an ink and generally defines the viscosity and tackiness. The key properties of an ink formulation are the viscosity, and the solids loading. In order to form a good coating, inks are required to have a high viscosity, similar for example to a thick honey. If the viscosity is too high, the ink will not distribute itself across the screen properly for an even and well-distributed print. Likewise, if the viscosity of the ink is too low, the print quality also suffers since the ink will not distribute itself properly across the screen during the printing and may result in smearing of the desired pattern.

Typical particle sizes of the starting powder range from 2 $\mu$m to 50 $\mu$m. The ink goes through a blending and milling process, which reduces the particle size down to 1–25 μm. Typically screens are made of polyester or stainless steel monofilaments woven into a grid pattern. Monofilament diameters range from 0.6 mils (or 15 μm) up to 15.2 mils (or 385 μm). Typical square openings formed by the monofilaments measured as one side of the square, range from about 1.1 mils (or 26 μm) up to 10.5 mils (or about 266.7 μm). Patterns on the screen printer can typically range from 5 mils up to 10" across.

Examples 1–16

A standard carrier used in the following experiments had the following formulation:

1.1 wt % N100 Ethyl Ether Cellulose (Hercules-Aqualon N100 grade) dissolved overnight in a 1:1 mixture of a-Terpineol (Aldrich) and Texanol (American Chemicals).

The following formulations are examples only. The possible variations are not limited to this list. Also prepared and used were other carriers with the following formulations. These variations were used to change the viscosity and solids loading of the final inks.

(1) 1.1 wt % N50 Ethyl Ether Cellulose (Hercules-Aqualon N50 grade) dissolved in a 1:1 mixture of a-Terpineol (Aldrich) and Texanol (American Chemicals)

(2) 1.1 wt % N300 Ethyl Ether Cellulose (Hercules-Aqualon N300 grade) dissolved in a 1:1 mixture of a-Terpineol (Aldrich) and Texanol (American Chemicals)

(3) 0.55 wt % N100 Ethyl Ether Cellulose (Hercules-Aqualon N100 grade) dissolved in a 1:1 mixture of a-Terpineol (Aldrich) and Texanol (American Chemicals)

(4) 1.65 wt % N100 Ethyl Ether Cellulose (Hercules-Aqualon N100 grade) dissolved in a 1:1 mixture of a-Terpineol (Aldrich) and Texanol (American Chemicals)

(5) 2.5% wt % XLO-VP (Ethyl cellulose) in deionized water.

The compositional details of the various experimental inks that were prepared are listed in Table 1. A detailed description of a typical preparation (Example 6) is listed below.

First, 30.0 mL of a-terpineol (Aldrich) was measured out into a graduated cylinder, to which 30.0 mL of Texanol (American Chemical) was added. The mixture was the placed into a beaker with a magnetic stir-bar and allowed to stir for 5 minutes. Then, 1.10 wt % of Ethyl Ether Cellulose (Hercules-Aqualon N100 grade) was measured out and added to the a-Terpineol/Texanol mixture, which was allowed to stir covered overnight. Next, 20.0 grams of alumina (SBA-150) powder was weighed out into a mixing bowl to which 18.0 grams of the above solution was added. Finally, 0.80 gram of Sarkosyl-O (CIBA) and 3.0 grams of a-Terpineol were added, and the whole mixture was blended thoroughly with a spatula and processed in a Ross 2.5×5 three-roll mill.

This blended ink was used in a screen printer to produce a coating onto a cordierite sheet. It was then dried at 100° C. for 15 minutes, followed by calcinations at 540° C. for 2 hours. The resulting product is a coating of alumina on the surface of the ceramic sheet.

TABLE 1

Examples of ink compositions

| | | | grams of ingredient added | | | |
|---|---|---|---|---|---|---|
| Example | Material/Catalyst | Carrier type[a] | Material/catalyst | Carrier | Sarkosyl-O | a-Terpineol |
| 1 | 3% Pt/Al$_2$O$_3$ | 1.1% N100 | 14.0 | 11.0 | 0.80 | 0.40 |
| 2 | 3% Cu/ZSM-5 | 1.1% N100 | 10.0 | 10.5 | 0.50 | 1.00 |
| 3 | ZSM-5 | 1.1% N100 | 10.0 | 9.3 | 0.20 | 1.00 |
| 4 | ZSM-5 | 1.1% N100 | 4.0 | 3.7 | 0.08 | 0.40 |
| 5 | ZSM-5 | 2.5% XLO-VP | 4.0 | 4.5 | | |
| 6 | Al$_2$O$_3$ | 1.1% N100 | 20.0 | 18.0 | 0.80 | 3.00 |
| 7 | Al$_2$O$_3$ | 1.1% N100 | 60.0 | 54.0 | 2.40 | 9.00 |
| 8 | CeO$_2$ | 1.1% N100 | 32.0 | 18.0 | 1.00 | 3.00 |
| 9 | CeO$_2$ | 1.1% N100 | 96.0 | 54.0 | 3.00 | 5.00 |
| 10 | CeO$_2$ | 1.1% N50 | 32.0 | 18.0 | 1.00 | 1.60 |
| 11 | CeO$_2$ | 1.1% N300 | 32.0 | 18.0 | 1.00 | 1.60 |
| 12 | CeO$_2$ | 0.55% N100 | 32.0 | 18.0 | 1.00 | 1.60 |
| 13 | CeO$_2$ | 1.65% N100 | 32.0 | 18.0 | 1.00 | 1.60 |
| 14 | TiO$_2$ | 1.1% N100 | 30.0 | 35.0 | 3.50 | 0.00 |
| 15 | Na$_2$CO$_3$ | 1.1% N100 | 50.0 | 30.0 | 2.00 | 0.00 |
| 16 | K$_2$CO$_3$ | 1.1% N100 | 50.0 | 24.0 | 1.50 | 0.00 |

[a] As described in the text above

Example 17

A spray gun was used to spray coat four different catalyst slurries onto the cordierite sheet. The following four slurries and the corresponding masks (referring to FIG. 2) were used: Zeolite Y (mask A), Cu-ZSM-5 (mask B), Pt—Al$_2$O$_3$ (mask C), and CeO$_2$ (mask D).

After the spray coatings were completed, there were sixteen individual and unique areas of the cordierite sheet with different coatings. The coated sheet was calcinated to 1000° F. for 2 hours to remove any moisture and organic components.

Circular sections were drilled out of the sheet in the various unique areas. The drill bit used was a diamond-tipped coring bit with an I.D. of 3.89 mm. The coatings held up very well under the drilling process, and minimal flaking and damage was observed under an optical microscope. The diameter of the circular sections ranged between 3.5 and 3.6 mm.

The goal was to deposit approximately 0.0075 g/in$^2$ of each of the four slurries. The resulting coatings for the four slurries were as follows: 0.0109 g/in$^2$ of Zeolite Y, 0.0087 g/in$^2$ of Cu-ZSM-5, 0.0094 g/in$^2$ of Pt—Al$_2$O$_3$ and 0.0114 g/in$^2$ CeO$_2$. The coating quality was judged to be excellent, with minimal intrusion into other areas and an absence of patchy areas. When observed under an optical microscope, the thickness of the individual coatings were measured at between 15–25 μm, while the overall thickness of all four coatings was observed to be between 70–90 μm.

Example 18

Cordierite sheets were fired as previously described. A screen printer was utilized to deposit catalyst ink onto a 6.75×6.75" sheet. This sheet was pre-perforated with 4 mm diameter circular sections, and placed on top of a non-perforated cordierite sheet (see FIG. 6). An alumina-containing ink was used and deposited through a screen. The screen allowed for the deposition of 32 identical ⅝" squares arranged in a 4 row×8 column pattern with ⅛" spacing on all sides.

The resulting coated sheet was calcinated at 540° C. for 2 hours.

The goal was to deposit approximately 0.01 g/in$^2$ of the ink, and the resulting calcined coating was 0.0097 g/in$^2$. Coating quality was excellent, with extremely sharp defined borders and no intrusion into other areas. The observed thickness was measured to be between 12 and 25 μm.

Some of the pre-cut circular sections were removed for further evaluation.

Example 19

Cordierite sheets were fired as previously described. A screen printer was utilized to deposit catalyst ink onto 6.75×6.75" sheets. The sheets were pre-perforated with 4 mm diameter circular sections. Each sheet was placed on top of a non-perforated cordierite sheet (see FIG. 6). The screen pattern was a simple 7×7" square, thus providing total coverage of the surface of the cordierite sheet with a uniform coating. An alumina-containing ink was applied.

The resulting coated sheets were calcined at 540° C. for 2 hours. The resulting depositions were 17.33 mg/in$^2$ and 17.01 mg/in$^2$, respectively, for two coated sheets. Some of the pre-cut circular sections were selectively removed for further evaluation.

Example 20

A screen printer was used to deliver varying amounts (weight and/or thickness) of a particular component to different regions of a 6.75×6.75" cordierite sheet fired as previously described. This sheet was pre-perforated with 4 mm diameter circular sections, and placed on top of a non-perforated cordierite sheet (see FIG. 6). Three coatings of an ink containing 3% Pt/alumina were delivered by using screens containing 32 discrete ⅝" squares (arranged in different locations for each treatment). This resulted in a series of square patterns containing 1, 2, or 3 coatings of Pt/alumina. The resulting coated sheet was calcined at 540° C. for 2 hours. The first coating application led to deposition of 46.73 mg Pt/alumina per ⅝" square, while 41.72 mg and 46.84 mg per square were delivered in second and third coatings, respectively.

Four pellets, or circular sections with a 4 mm diameter, were removed from the sheet, each pellet consisting of the cordierite base and the catalyst coating on the top. All of the samples were removed from regions that contained three coatings of Pt/alumina as described above. The catalyst pellets were placed in a reactor where gas containing 496 ppm of butane, 18% oxygen and the remainder helium, was passed over each of the catalyst samples individually. The gas exiting the reactor for each pellet was analyzed by a scanning mass spectrometer. At 350° C., the conversion of butane to carbon dioxide was measured at 44.8%, 45.7%, 44.6% and 43.6%, respectively, for the four catalyst samples. From these results, the average conversion for the three-layer coating was determined to be 44.7%.

Example 21

Cordierite sheets were fired as previously described. A screen printer was utilized to deposit a catalyst ink onto a 6.75×6.75" sheet.

The screen was a 6×6" gradient pattern with openings ranging from 10% open area to 100% open area in 1% increments (90 steps total). The pattern on the screen can be described in terms of dividing the entire area into a large number of cells. The extent of exposure or opening of each cell is then gradually increased across one axis. An example of such a pattern is shown in FIG. 8 where the dark areas correspond to the openings or the pattern that is generated upon coating. An ink containing 3% Pt/alumina was used, and the resulting coating was excellent with extremely sharp defined edging and no intrusion into other areas. The resulting coating was calcined at 540° C. for 2 hours.

Example 22

Cordierite sheets were fired as previously described. The procedure described in Example 21 was followed, except after deposition of the first coat, a second coat, containing a different ink, with the configuration of the screen rotated 90° with respect to the first coating. The first ink contained 3% Pt/alumina, while the second contained ceria. The final coated sheet was dried at 90° C. for one hour. The amount of dried 3% Pt/alumina ink deposited was 0.1732 grams, and the amount of dried CeO2 ink deposited was 0.3403 grams. The resulting pattern corresponds to the configuration shown in FIG. 7A.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A method of making a library of a plurality of different composite samples placed on a substrate sheet comprising: cutting the substrate sheet so as to provide said sheet with a plurality of cut shaped portions which are spaced from each other on the surface of the sheet, depositing at least one component on the surface of said sheet whereby the cut shaped portions of said sheet are covered by at least one of said deposited components, and removing said covered cut shaped portions of said sheet to form composite samples, said composite samples comprising said substrate containing at least one deposited component thereon in the form of said shaped portion, testing said composite samples for properties.

2. The method of claim 1, wherein said substrate sheet is cut from a roll.

3. The method of claim 2 wherein said substrate sheet is a tape cast ceramic.

4. The method of claim 1, wherein said substrate sheet is a ceramic.

5. The method of claim 4, wherein said ceramic is cordierite.

6. The method of claim 1, wherein said cut shaped portions are still attached to said substrate sheet, said composite samples being removed from said sheet by applying pressure to said cut shaped portions.

7. The method of claim 6, wherein said cut shaped portions are formed from perforations made on the surface of said substrate sheet.

8. The method of claim 1, wherein said cut shaped portions of said substrate sheet are fully cut so as to separate from said substrate sheet, depositing said component while a second substrate sheet is placed below and in contact with said substrate sheet onto which at least one component is being deposited so as to maintain said cut shaped portions in place during said depositing.

9. The method of claim 1, wherein said substrate sheet is a tape cast ceramic and said tape cast ceramic is cut to form said cut shaped portions.

10. The method of claim 1, wherein subsequent to cutting said substrate to form said cut shaped portions, firing said sheet to harden same prior to depositing said components.

11. The method of claim 10, wherein said substrate sheet is cordierite.

12. The method of claim 10 wherein said substrate sheet is alumina.

13. The method of claim 1, wherein at least one of said deposited components is in the form of a metal salt, elemental metal, metallic oxide, metal oxide ceramic, non-oxide ceramic or carbon.

14. The method of claim 1, wherein at least one of said deposited components is a polymer.

15. A method of producing a library of compositions on a substrate sheet comprising: forming a plurality of different compositions on said substrate sheet, said compositions formed by depositing one or more components on said substrate sheet to form different composite compositions or reacting said deposited components to form said different compositions, removing at least one of said composite compositions or said formed compositions along with said underlying substrate from said substrate sheet.

16. The method of claim 15 wherein said plurality of different compositions are formed on said substrate sheet by depositing at least first and second of said components onto separate first and second, discrete, predefined regions of said substrate sheet and subsequently depositing at least third and fourth components onto said first and second discrete, predefined regions, respectively.

17. The method of claim 15 wherein at least one of said components is deposited as a layer across said substrate sheet in the form of a continuous concentration gradient of said at least one component.

18. The method of claim 15 wherein said compositions are removed from said substrate sheet by cutting said composite compositions along with said underlying substrate from said substrate sheet.

19. The method of claim 15 wherein said composite compositions removed from said substrate sheet are heterogeneous catalysts.

20. The method of claim 15, further comprising testing at least one of said composite compositions or said formed compositions for properties.

21. A method of producing a library of different composite compositions on a substrate sheet comprising: forming a composition containing a uniform concentration of at least one component, non-uniformly depositing said composition as a layer across said substrate sheet so as to form a continuous concentration gradient of said at least one component, defining a sample area of said deposited composition for testing, said sample area being less than said layer and containing a concentration gradient of said at least one component, removing said sample area along with underlying substrate from said substrate sheet, and testing said removed sample area for properties.

22. The method of claim 21, wherein said sample area is removed from said substrate sheet by cutting said deposited composition along with said underlying substrate from said substrate sheet.

23. The method of claim 22, wherein said sample area removed from said substrate sheet is a heterogeneous catalyst.

24. The method of claim 21, wherein said composition is deposited as a dry solid or as a solid contained within a liquid earner onto said substrate sheet.

25. The method of claim 24, wherein said composition is deposited as a slurry of said component in a liquid carrier.

26. The method of claim 24, wherein said composition is deposited as a solution of said component within a solvent.

27. The method of claim 21, wherein said composition is deposited onto said substrate sheet by a screen-printing process.

28. The method of claim 21, wherein said component is in the form of a metal salt, elemental metal, metallic oxide, metal oxide ceramic, non-oxide ceramic or carbon.

29. The method of claim 28 wherein at least one of said components is a metal or metal salt contained on a particulate carrier.

30. The method of claim 29, wherein said metal or metal salt comprises a metal selected from the group consisting of Pt, Pd, Rh, Ru, Ag and Au, and said particulate carrier is alumina.

31. The method of claim 21, wherein said component is a polymer.

32. The method of claim 21, wherein said substrate sheet is substantially flat.

33. The method of claim 21, wherein said substrate sheet is formed of a component selected from metal, ceramic, glass, polymer or composite of at least two of said components.

34. The method of claim 33, wherein said substrate sheet is cordierite.

35. The method of claim 33, wherein said substrate sheet is alumina, aluminum or stainless steel.

36. The method of claim 21, wherein said concentration gradient of said component exists along only one axis of said substrate sheet.

37. The method of claim 21, wherein said concentration gradient of said component exists along at least two axes of said substrate sheet.

38. The method of claim 21, wherein a plurality of said composition layers are deposited sequentially as layers onto said substrate sheet, at least one of said plurality of composition layers being non-uniformly deposited so as to form a concentration gradient of a component across the surface of said substrate sheet.

39. The method of claim 38, wherein one of said plurality of compositions is deposited to provide a uniform concentration of a component across said substrate sheet and at least one of said plurality of compositions is non-uniformly deposited as a layer so as to form a concentration gradient of a component across the substrate sheet.

40. The method of claim 38, wherein at least two of said compositions are formed, each of said compositions containing a component, said compositions being sequentially non-uniformly deposited as layers on said substrate sheet so as to form concentration gradients of the respective components of said at least two compositions across the substrate sheet.

41. The method of claim 40, wherein the minimum concentration loading for each of said respective components is along the same edge of said substrate sheet and said concentration increases along one axis of said substrate sheet.

42. The method of claim 40, wherein the minimum concentration loading for each of said respective components is on opposites edges of said substrate sheet and said loading increases along one axis of said sheet.

43. The method of claim 40, wherein the minimum concentration loading for each of said respective components is on adjacent edges of said substrate sheet and said concentration loading increases along single, but different axes of said sheet.

44. The method of claim 40, wherein the concentration of at least one of said components varies across said sheet along the diagonal between x and y axes of said substrate sheet.

45. The method of claim 38, wherein at least a portion of at least one of said composition layers is mixed with at least one contiguous composition layer on said sheet.

46. The method of claim 45 wherein at least one of said composition layers is fully mixed with at least a contiguous composition layer on said substrate sheet.

47. The method of claim 38 wherein said at least one of said plurality of compositions contains as a component a metal or metal salt contained on a particulate carrier.

48. The method of claim 47, wherein said metal or metal salt comprises a metal selected from the group consisting of Pt, Pd, Rh, Ru, Ag and Au, and said particulate carrier is alumina.

49. The method of claim 21 wherein said composite composition is a catalyst.

50. The method of claim 21 wherein said composite composition is an adsorbent.

51. The method of claim 21 wherein said composite composition is a pigment.

52. The method of claim 21 wherein said sample is tested for catalytic properties.

* * * * *